(12) United States Patent
Krishnamurthy

(10) Patent No.: US 11,381,888 B2
(45) Date of Patent: Jul. 5, 2022

(54) AI-ASSISTED SOUND EFFECT GENERATION FOR SILENT VIDEO

(71) Applicant: Sony Interactive Entertainment Inc., Tokyo (JP)

(72) Inventor: Sudha Krishnamurthy, Foster City, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/848,512

(22) Filed: Apr. 14, 2020

(65) Prior Publication Data

US 2021/0321172 A1    Oct. 14, 2021

(51) Int. Cl.
| | |
|---|---|
| H04N 21/854 | (2011.01) |
| G06F 16/638 | (2019.01) |
| G06N 3/04 | (2006.01) |
| G06V 20/40 | (2022.01) |
| G10L 13/027 | (2013.01) |
| H04N 21/439 | (2011.01) |
| H04N 21/44 | (2011.01) |
| H04N 21/845 | (2011.01) |
| G06F 16/63 | (2019.01) |

(52) U.S. Cl.
CPC ......... *H04N 21/854* (2013.01); *G06F 16/638* (2019.01); *G06N 3/04* (2013.01); *G06V 20/46* (2022.01); *G10L 13/027* (2013.01)

(58) Field of Classification Search
USPC ................. 386/239–248, 278–290
See application file for complete search history.

(56) References Cited

U.S. PATENT DOCUMENTS

| | | | | |
|---|---|---|---|---|
| 9,094,636 | B1* | 7/2015 | Sanders | G11B 20/10527 |
| 9,373,320 | B1* | 6/2016 | Lyon | G10L 21/0388 |
| 10,032,457 | B1* | 7/2018 | Liu | G10L 19/005 |
| 2012/0033132 | A1* | 2/2012 | Chen | H04N 5/04 |
| | | | | 348/462 |

(Continued)

OTHER PUBLICATIONS

Owens et al., "Audio-Visual Scene Analysis with Self-Supervised Multisensory Features", Computer Vision Foundation, 2018, 18 pages. (Year: 2018).*

(Continued)

*Primary Examiner* — Hung Q Dang
(74) *Attorney, Agent, or Firm* — JDI Patent; Joshua D. Isenberg; Robert A. Pullman

(57) ABSTRACT

Sound effect recommendations for visual input are generated by training machine learning models that learn coarse-grained and fine-grained audio-visual correlations from a reference visual, a positive audio signal, and a negative audio signal. A trained Sound Recommendation Network is configured to output an audio embedding and a visual embedding and use the audio embedding and visual embedding to compute a correlation distance between an image frame or video segment and one or more audio segments retrieved from a database. The correlation distances for the one or more audio segments in the database are sorted and one or more audio segments with the closest correlation distance from the sorted audio correlation distances are determined. The audio segment with the closest audio correlation distance is applied to the input image frame or video segment.

22 Claims, 8 Drawing Sheets

(56) References Cited

U.S. PATENT DOCUMENTS

2018/0232451 A1* 8/2018 Lev-Tov ................. G06N 3/08
2021/0035599 A1* 2/2021 Zhang ................ H04N 21/8106

OTHER PUBLICATIONS

B. Kang, Y. Kim and D. Kim, "Deep Convolutional Neural Network Using Triplets of Faces, Deep Ensemble, and Score-Level Fusion for Face Recognition," 2017 IEEE Conference on Computer Vision and Pattern Recognition Workshops (CVPRW), Honolulu, HI, 2017, pp. 611-618.
Di Hu et al., "Deep Multimodal Clustering for Unsupervised Audiovisual Learning", arXiv:1807.03094v3 [cs.CV] Apr. 19, 2019.
Elad Hoffer and Nir Ailo, "Deep Metric Learning Using Triplet Network", In: Feragen A., Pelillo M., Loog M. (eds) Similarity-Based Pattern Recognition. SIMBAD 2015. Lecture Notes in Computer Science, vol. 9370. Springer, Cham, Nov. 25, 2015.
Hochreiter & Schmidhuber. "Long Short-term memory." Neural Computation 9(8): 1735-1780 (1997).
Relja Arandjelovic and Andrew Zisserman, "Objects that Sound", arXiv:1712.06651v2 [cs.CV] Jul. 25, 2018.
International Search Report and Written Opinion of the International Searching Authority for International Patent Application No. PCT/US2021/026554.

* cited by examiner

AI-ASSISTED SOUND EFFECT GENERATION FOR SILENT VIDEO

CROSS-REFERENCE TO RELATED APPLICATION

This application is related to commonly assigned, application Ser. No. 16/848,484, filed Apr. 14, 2020, and commonly assigned, application Ser. No. 16/848,499, filed the entire disclosures of which are incorporated herein by reference.

FIELD OF THE INVENTION

The present disclosure relates to sound effect selection for media, specifically aspects of the present disclosure relate to using machine-learning techniques for sound selection in media.

BACKGROUND OF THE INVENTION

Sound designers for video games and movies often look at objects occurring in video to determine what sounds to apply to the video. Since the inception of sound synchronized movies (colloquially called talkies) sound designers, have been generating corpuses of recorded audio segments. Today, these collections of audio segments are stored in digital audio databases that are searchable by the sound designers.

When a sound designer wants to add a sound effect to a silent video sequence, they have to watch the video sequence and imagine what the sounds occurring within the video might be like. Then the designer must search through the sound database and find sounds that match the context in the visual scene. This makes the sound designing process quite an artistic, iterative process and means that sounds chosen for media sometimes differ radically from reality. In everyday life, most objects create sounds based on their physical properties and not based on an imagined sound design. Thus, sounds can be considered to be almost related to the physical context of their productions.

BRIEF DESCRIPTION OF THE DRAWINGS

The teachings of the present disclosure can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

According to aspects of the present disclosure, Neural Networks (NN) and machine learning may be applied to sound design to choose appropriate sounds for video sequences that lack sound. Three techniques for developing a Sound Effect Recommendation Tool will be discussed herein. First general NN training methods will be discussed. Second, a method will be discussed for training a coarse-grained correlation NN for prediction of sound effects based on a reference video, directly from an audio mixture as well as by mapping the audio mixture to single audio sources using a similarity NN. The third method that will be discussed is for training a fine-grained correlation NN for recommending sound effects based on a reference video. Finally, use of a tool employing the trained Sound Effect Recommendation Networks individually or as a combination will be discussed.

General Nn Training

According to aspects of the present disclosure, the Sound Effect Recommendation Tool may include one or more of several different types of neural networks and may have many different layers. By way of example and not by way of limitation a classification neural network may consist of one or multiple deep neural networks (DNN), such as convolutional neural networks (CNN) and/or recurrent neural networks (RNN). The Sound Effect Recommendation Tool may be trained using the general training method disclosed herein.

Figure 1A:
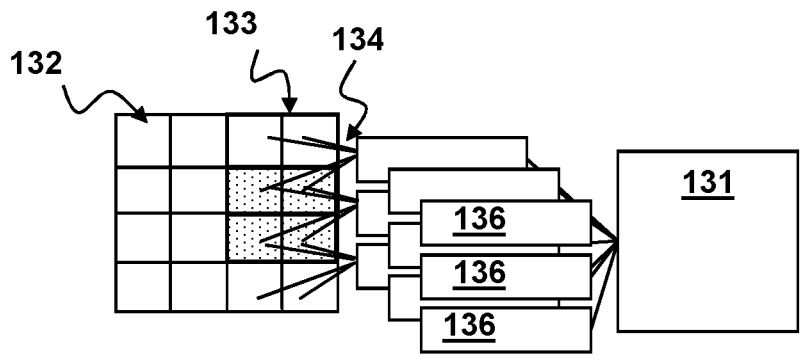
FIG. 1A is a simplified diagram of a convolutional neural network for use in a Sound Effect Recommendation Tool according to aspects of the present disclosure.

FIG. 1A depicts an example layout of a convolution neural network according to aspects of the present disclosure. In this depiction, the convolution neural network is generated for an input 132 with a size of 4 units in height and 4 units in width giving a total area of 16 units. The depicted convolutional neural network has a filter 133 size of 2 units in height and 2 units in width with a stride value of 1 and a channel 136 of size 9. For clarity in FIG. 1A only the connections 134 between the first column of channels and their filter windows is depicted. Aspects of the present disclosure, however, are not limited to such implementations. According to aspects of the present disclosure, the convolutional neural network may have any number of additional neural network node layers 131 and may include such layer types as additional convolutional layers, fully connected layers, pooling layers, max pooling layers, normalization layers, etc. of any size.

Figure 1B:
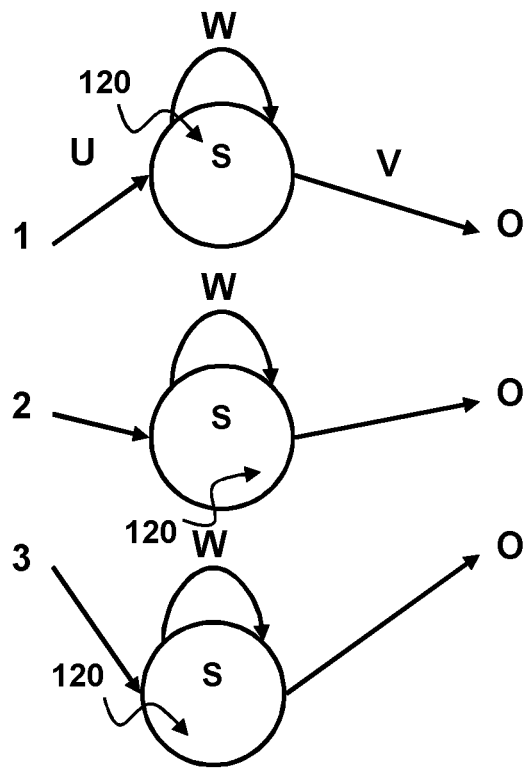
FIG. 1B is a simplified node diagram of a recurrent neural network for use in a Sound Effect Recommendation Tool according to aspects of the present disclosure.
Figure 1C:
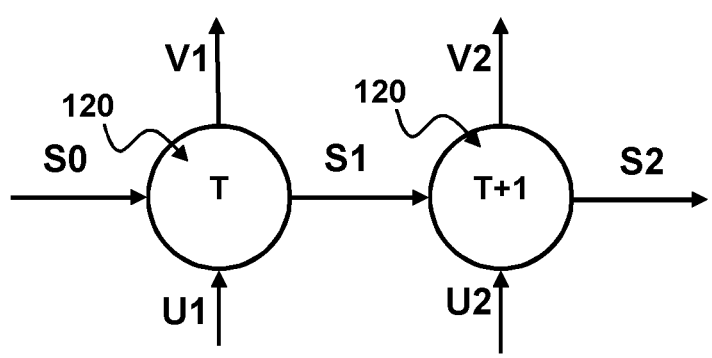
FIG. 1C is a simplified node diagram of an unfolded recurrent neural network for use in a Sound Effect Recommendation Tool according to aspects of the present disclosure.

For illustrative purposes a RNN is described herein, it should be noted that RNNs differ from a basic NN in the addition of a hidden recurrent layer. FIG. 1B depicts the basic form of an RNN having a layer of nodes 120, each of which is characterized by an activation function S, input U, a recurrent node weight W, and an output V. The activation function S is typically a non-linear function known in the art and is not limited to the (hyperbolic tangent (tanh) function. For example, the activation function S may be a Sigmoid or ReLU function. As shown in FIG. 1C, the RNN may be considered as a series of nodes 120 having the same activation function with the value of the activation function S moving through time from S0 prior to T, S1 after T and S2 after T+1. The nodes in a layer of RNN apply the same set of activation functions and weights to a series of inputs. The output of each node depends not just on the activation function and weights applied on that node's input, but also on that node's previous context. Thus, the RNN uses historical information by feeding the result from a previous time T to a current time T+1.

In some embodiments, a convolutional RNN may be used, especially when the visual input is a video. Another type of RNN that may be used is a Long Short-Term Memory (LSTM) Neural Network which adds a memory block in a RNN node with input gate activation function, output gate activation function and forget gate activation function resulting in a gating memory that allows the network to retain some information for a longer period of time as described by Hochreiter & Schmidhuber "Long Short-term memory" Neural Computation 9(8):1735-1780 (1997), which is incorporated herein by reference.

Figure 1D:
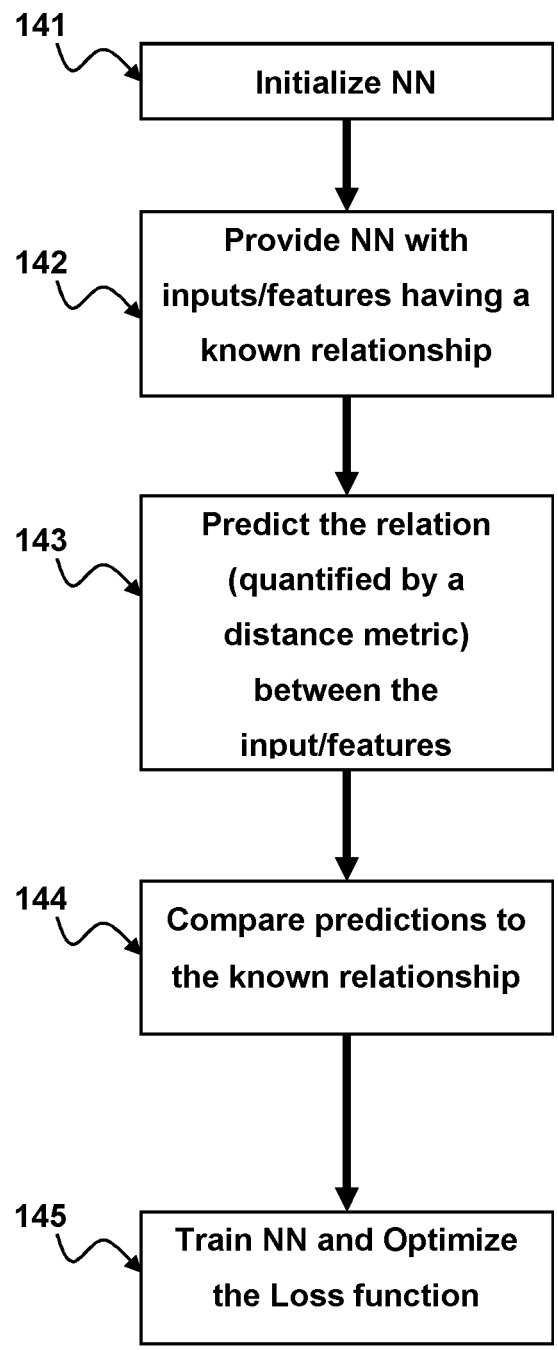
FIG. 1D is a block diagram of a method for training a neural network in development of a Sound Effect Recommendation Tool according to aspects of the present disclosure.

As seen in FIG. 1D Training a neural network (NN) begins with initialization of the weights of the NN at 141. In general, the initial weights should be distributed randomly. For example, an NN with a tanh activation function should have random values distributed between $$-\frac{1}{\sqrt{n}} \text{ and } \frac{1}{\sqrt{n}}$$

where n is the number of inputs to the node.

After initialization the activation function and optimizer is defined. The NN is then provided with a feature vector or input dataset at 142. Each of the different feature vectors may be generated by the NN from inputs that have known relationships. Similarly, the NN may be provided with feature vectors that correspond to inputs having known relationships. The NN then predicts a distance between the features or inputs at 143. The predicted distance is compared to the known relationship (also known as ground truth) and a loss function measures the total error between the predictions and ground truth over all the training samples at 144. By way of example and not by way of limitation the loss function may be a cross entropy loss function, quadratic cost, triplet contrastive function, exponential cost, mean square error etc. Multiple different loss functions may be used depending on the purpose. By way of example and not by way of limitation, for training classifiers a cross entropy loss function may be used whereas for learning an embedding a triplet contrastive loss function may be employed. The NN is then optimized and trained, using known methods of training for neural networks such as backpropagating the result of the loss function and by using optimizers, such as stochastic and adaptive gradient descent etc., as indicated at 145. In each training epoch, the optimizer tries to choose the model parameters (i.e., weights) that minimize the training loss function (i.e. total error). Data is partitioned into training, validation, and test samples.

During training, the Optimizer minimizes the loss function on the training samples. After each training epoch, the model is evaluated on the validation sample by computing the validation loss and accuracy. If there is no significant change, training can be stopped and the most optimal model resulting from the training may be used to predict the labels or relationships for the test data.

Thus, the neural network may be trained from inputs having known relationships to group related inputs. Similarly, a NN may be trained using the described method to generate a feature vector from inputs having known relationships.

Self-Supervised Audio-Visual Correlation

The automated methods for recommending sound effects for visual scenes is based on learning audio-visual correlations by training on a large number of example videos (such as video games or movie clips), with one or more sound sources mixed together. One method to generate training data in order to train a model that learns audio-visual relationships is to generate audio-visual segment pairs from videos with labeled sound sources. However, manually detecting and labeling each sound source to create a large training dataset is not scalable. The methods described in this disclosure describe the case when the visual scenes and corresponding sound sources are not explicitly labeled. However, the disclosed methods can be adapted to the case even when such labels are available.

Audio is first extracted from the video and each second of video frame is paired with the corresponding sound to create pairs of audio-visual training examples from which correlation can be learned. Each audio-visual training pair consists of a visual scene having one or more objects and actions, paired with audio comprising one or more sound sources mixed together (henceforth referred to as noisy audio), without any explicit labels or annotations describing the visual elements or sound sources. Given this set of audio-visual training pairs, independent methods are disclosed to 1) learn a coarse-grained correlation between the visual input and noisy audio input directly, without separating the noisy audio into its sound sources, 2) learn a coarse-grained correlation by first predicting the dominant single sound sources (henceforth referred to as clean audio) in the noisy audio and using those single sound sources to learn a correlation with the visual input, 3) learn a more fine-grained correlation between local regions of the visual input and regions of the noisy audio input. After training, these methods can be used independently or as an ensemble (mixture of models) to recommend sound effects for a visual scene. These 3 methods are now described.

Learning Coarse-Grained Correlation from Noisy Audio-Visual Pairs

Figure 2A:
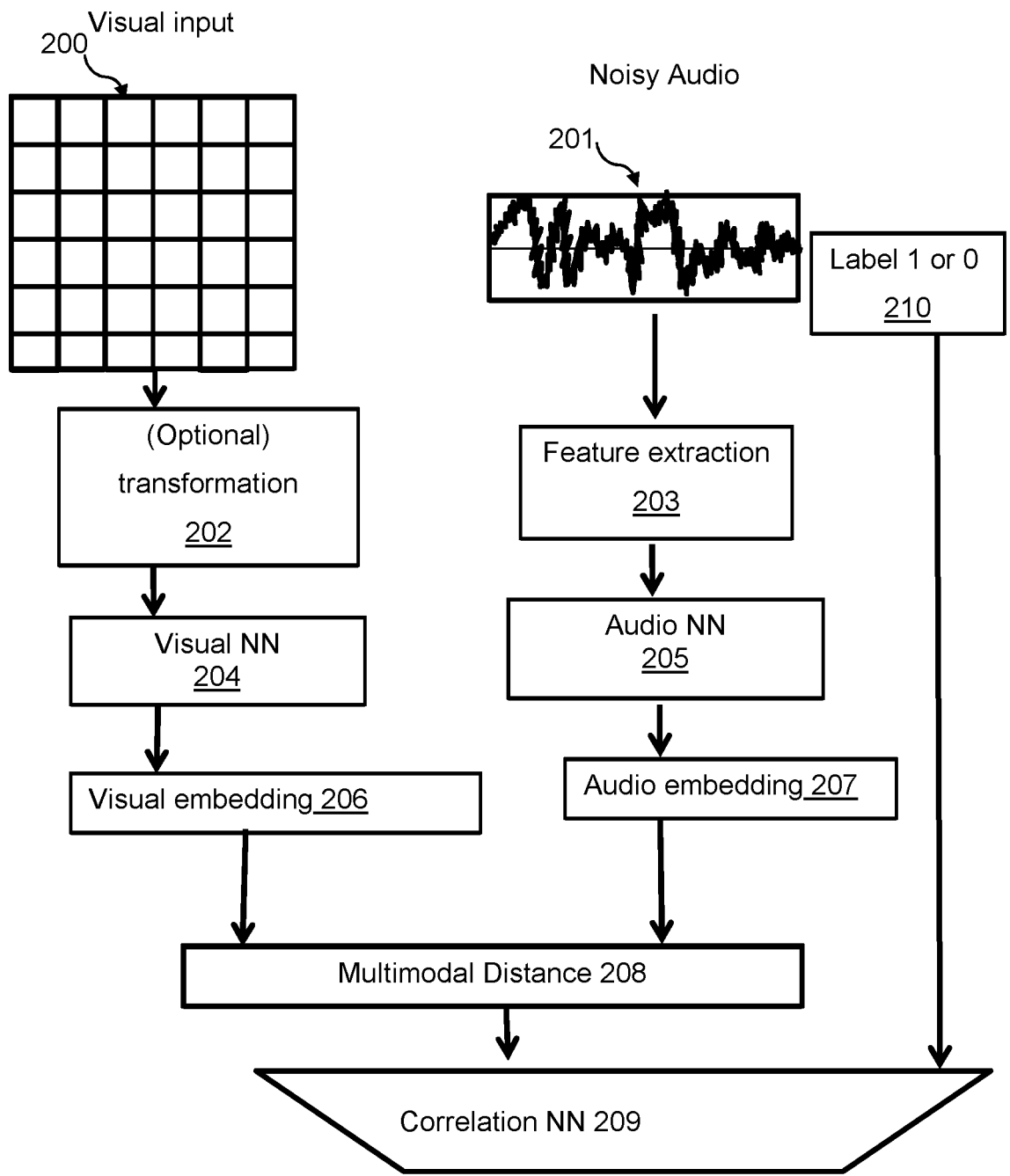
FIG. 2A is a block diagram depicting a method for training an audio-visual correlation NN using visual input paired with audio containing a noisy mixture of sound sources, for use in the Sound Recommendation tool, according to aspects of the present disclosure.

FIG. 2A depicts how a machine learning model is trained to learn the audio-visual correlation given a batch of audio-visual paired samples as training input. The visual input 200 may be a still image, video frame, or video segment. A noisy audio segment 201 may or may not be extracted from the visual input 200. In some embodiments, the noisy audio segment 201 is 1-second in duration but aspects of the present disclosure are not so limited and audio segments 201 may be greater than 1-second in other embodiments. The raw audio signals 201 according to aspects of the present disclosure may be in any audio or audio/video signal format known in the art for example and without limitation, the audio signals may be file types such as MP3s, WAV, WMA, MP4, OGG, QT, AVI, MKV, etc.

If one or more sound sources included in the audio input 201 is related to the visual input 200 then a corresponding label is applied representing that relationship. For example and without limitation, if the audio input 201 corresponds to an audio recording aligned with the same timeframe as the visual input 200 during the production of a video sequence, or the audio input 201 is a recording of sound made by an object or objects in the visual input 200, then the label 210 has a value 1. If the sound sources included in the audio input 201 is not related to the visual input 200 then a corresponding label representing the lack of a relationship is applied. For example and without limitation, if the audio input 201 and the visual input 200 are from different timeframes of a video sequence, then the label 210 has a value 0. The visual input 200 may be optionally transformed 202 (for example, resized, normalized, background subtraction) and applied as an input to a visual neural network 204. In some embodiments the visual NN 204 may be for example and without limitation a 2-dimensional or 3-dimensional CNN having between 8 and 11 convolutional layers, in addition to any number of pooling layers, and may optionally include batch normalization and attention mechanisms. The visual NN 204 outputs a visual embedding 206, which is a mathematical representation learned from the visual input 200.

Similarly, the noisy audio input 201 is processed by a feature extractor 203 that extracts audio features, such as mel-filter banks or similar 2-dimensional spectral features. The audio features may be, optionally, normalized and padded to ensure that the audio features that are input to the audio NN 205 have a fixed dimension. In some embodiments, the audio NN 205 may be for example and without limitation a CNN having between 8 and 11 convolutional layers with or without batch normalization, in addition to any number of pooling layers, and may, optionally, include batch normalization and attention mechanisms. The audio NN 205 outputs an audio embedding 207, which is a mathematical representation learned from the audio input 201.

One or more subnetwork layers that are part of the NNs 204 and 205 may be chosen suitable to create a representation, or feature vector of the training data. In some implementations the audio and image input subnetworks may produce embeddings in the form of feature vectors having 128 components, though aspects of the present disclosure are not limited to 128 component feature vectors and may encompass other feature vector configurations and embedding configurations. The audio embedding 207 and visual embedding 206 are compared by computing a distance value 208 between them. This distance value may be computed by any distance metric such as, but not limited to, Euclidean distance or L1 distance. This distance value is a measure of the correlation between the audio-visual input pair. Smaller the distance, higher is the correlation.

The correlation NN 209 predicts the correlation for an audio-visual input pair as a function of the distance value 208. NN 209 may contain one or more linear or non-linear layers. During each training epoch, the prediction values are compared to the binary labels 210 using a loss function such as cross-entropy loss and the error between the predictions and respective labels is backpropagated through the entire network, including 204, 205, and 209 to improve the predictions. The goal of training may be to minimize the cross-entropy loss that measures the error between the predictions and labels, and/or the contrastive loss that minimizes the distance value 208 between correlated audio-visual embeddings while maximizing the distance between uncorrelated embeddings. The pairwise contrastive loss function $L_{Pairs}$ between an audio-visual pair is given by EQ. 1:

$$L_{pair} = \Sigma_{(I_R,A) \in T} \|F(I_R) - F(A)\|_2^2 \qquad \text{EQ. 1}$$

where $F(I_R)$ is the output of the visual NN 204 for the reference image and $F(A)$ is output of the audio NN 205 for the Audio signal A.

After many iterations of training including both the negative, uncorrelated audio-visual input pairs and the positive, correlated audio-visual input pairs, the model depicted in FIG. 2A learns an audio embedding 207 and visual embedding 206, in such a way that the distance 208 between correlated audio and visual inputs is small, while the distance between the uncorrelated audio and visual embeddings is large. This trained pairwise audio-visual correlation model can be used in the Sound Recommendations tool to generate visual embeddings for any new silent video or image input and audio embeddings for a set of sound samples from which it can recommend the sound effects that are most correlated to the silent visual input by way of having the closest audio-visual embedding distance. The recommended sound effects may then be mixed with the silent visual input to produce a video with sound effects.

Learning Coarse-Grained Audio-Visual Correlation by Predicting Sound Sources

Figure 2B:
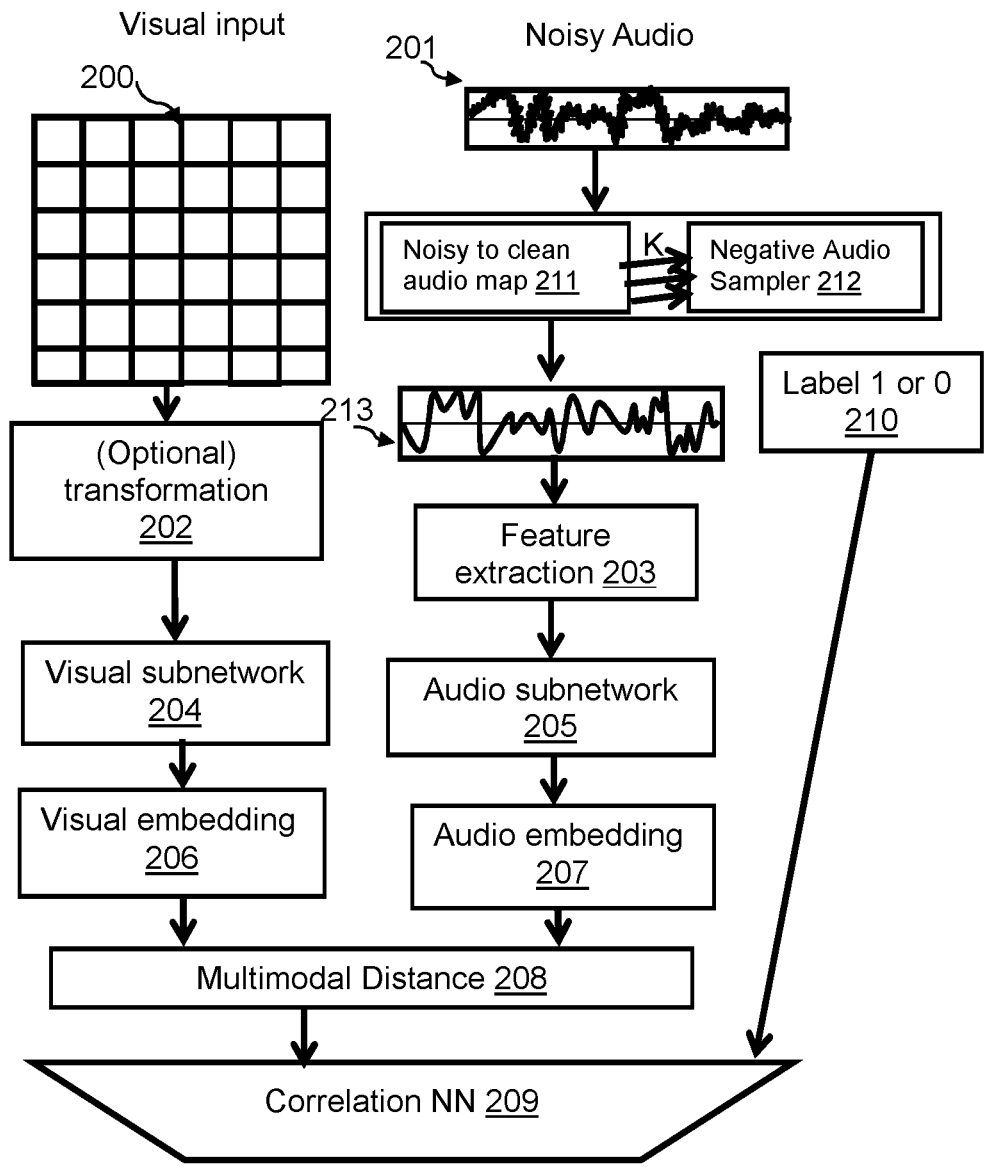
FIG. 2B is a block diagram depicting a method that first maps an audio containing a mixture of sound sources into individual sound sources, which are then paired with the visual input for training an audio-visual correlation NN for use in the Sound Recommendation tool, according to aspects of the present disclosure.

FIG. 2B shows an alternative embodiment to train a machine learning model for learning audio-visual correlation to recommend sounds for visual input. As described in the previous embodiment FIG. 2A, the visual input 200 is an image or video frame or video segment and the audio input 201 may be a mixture of one or more audio sources. The embodiment in FIG. 2B differs from FIG. 2A in how the training audio-visual pairs are generated. Unlike the previous embodiment, the noisy audio input 201 is not directly used for training in this method. Instead, it is first processed by a noisy to clean mapping module 211, which identifies the one or more dominant sound sources that may be included in the audio input 201.

The Noisy to Clean Mapping Module 211 may be trained in different ways. It may be an audio similarity model trained using pairwise similarity or triplet similarity methods. In some embodiments, it may be an audio classifier trained to classify sound sources in an audio mixture. Alternatively, it may be an audio source separation module trained using non-negative matrix factorization (NMF), or a neural network trained for audio source separation (for example U-net). Regardless of how it is trained, the purpose of the Noisy to Clean Mapping Module 211 is to identify the top-K dominant reference sound sources that best match or are included in the audio input 201, where K may be any reasonable value such as, but not limited to, a value between 1 and 5. These K sound sources may be considered as positive audio signals with respect to the visual input 200, because they are related to the visual scene. Given these K positive audio signals, Selection module 212 selects K negative reference audio signals that are either complementary or different from the K positive signals. Thus the result of the Noisy to Clean Mapping Module 211 and selection module 212 together is to predict a total of 2*K "clean" single source reference audio signals 213. These reference audio signals may or may not part of an audio database. The visual input 200 is paired with each of the 2*K predicted clean audio signals to create 2*K audio-visual pairs for training the correlation NN 209 in FIG. 2B, as described above for the previous embodiment shown in FIG. 2A. One half of the 2*K audio-visual pairs are positive pairs where the audio input is related or similar to the sound produced by one or more objects in the visual scene and each of these positive pairs has a label 210 of value 1. The other half of the 2*K audio-visual input pairs are negative pairs where the audio input is not related to the visual input 200 and each of these negative pairs has a label 210 of value 0. In some embodiments, the positive audio signals and negative audio signals may all be part of an audio database containing labeled audio signal files. The labeled audio signal files may be organized into a taxonomy where the K clean positive audio signals are part of the same category or sub category as the signals in the audio input 201, whereas the K clean negative audio signals may be part of a different category or sub category than the K positive audio signals.

Figure 3:
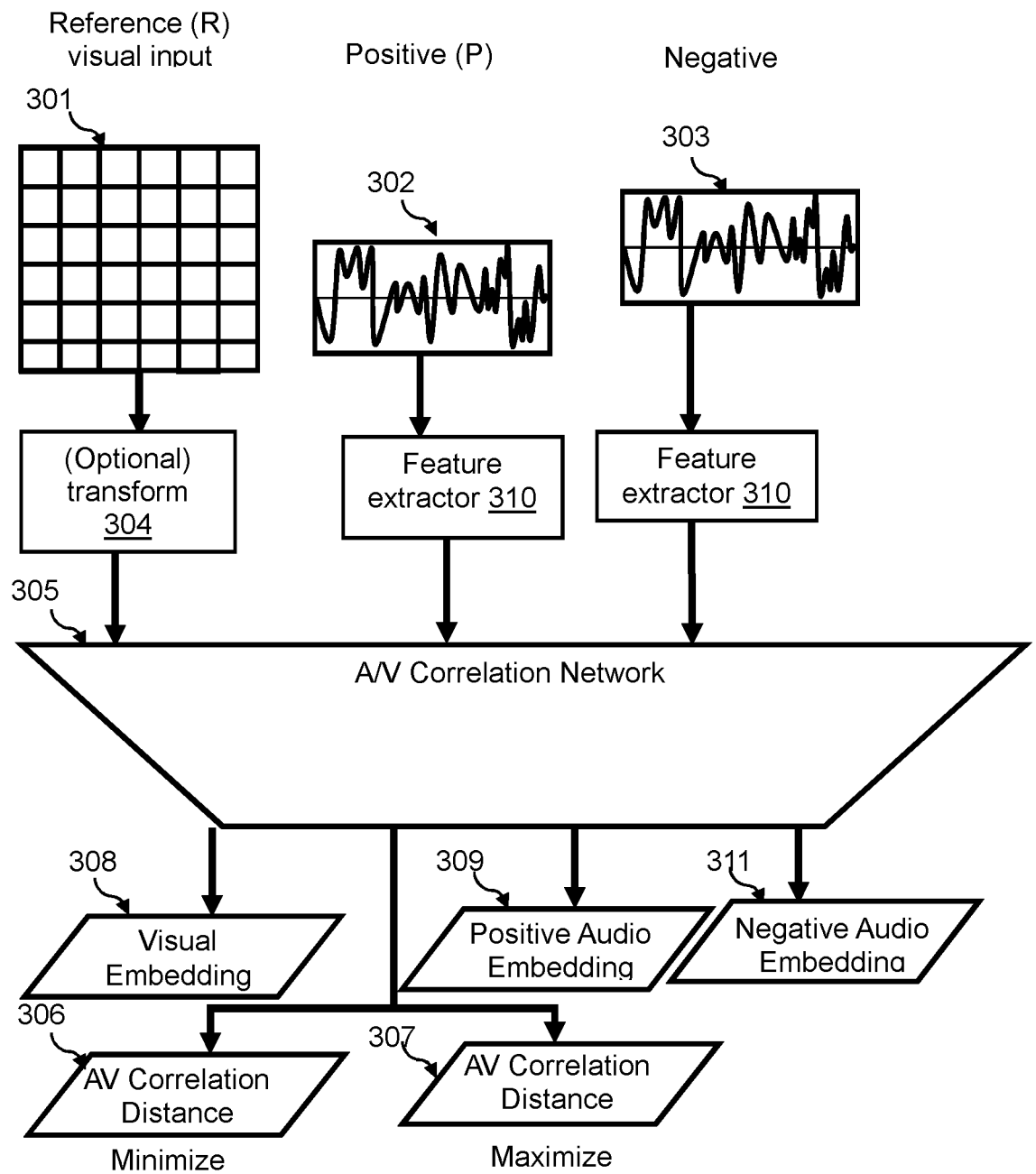
FIG. 3 is a block diagram depicting training of an audio-visual Correlation NN that learns positive and negative correlations simultaneously using triplet inputs containing a visual input, positive correlated audio, and negative uncorrelated audio, for use in the Sound Recommendation tool according to aspects of the present disclosure.

In some embodiments, the audio-visual correlation is learned by a machine-learning model that takes triplets as inputs and is trained by a triplet contrastive loss function instead of a pairwise loss function. As shown in FIG. 3, the inputs to the correlation NN may be a reference image or video 301, a positive audio signal 302 and a negative audio signal 303. The reference image or video 301 may be a still image or part of a reference video sequence as described above in embodiment FIG. 2B. As described above, the positive audio signal 302 is related the reference image or video 301, for example and without limitation the positive audio may be a recording of sound made by an object or objects in the reference image, the positive audio may be a recording or corresponding audio made during the production of the reference image. As described above, the negative audio signal 303 is different from the positive audio signal 302 and not related to the reference visual input 301. In some embodiments, the visual input 301 may be the visual embedding 206 output by a trained correlation NN shown in FIG. 2B, and the positive audio input 302 and negative audio input 303 may be audio negative embeddings 207 output by a trained correlation NN shown in FIG. 2B, for a positive and negative audio signal respectively.

The visual input 301 may be optionally transformed by operations 304 such as, but not limited to, resizing and normalization, before it is input to the triplet correlation NN 305. Likewise, the positive and negative audio input may be preprocessed to extract audio features 310 that are suitable for training the correlation NN 305. In this embodiment, no additional labels are necessary. The correlation NN 305 is trained through multiple iterations to simultaneously learn a visual embedding and audio embeddings for the positive and negative audio input. The triplet contrastive loss function used to train NN 305 seeks to minimize the distance 306 between the reference visual embedding 308 and the positive audio embedding 309 while simultaneously maximizing the distance 307 between the reference visual embedding 308 and the negative audio embedding 311. The triplet contrastive learning loss function may be expressed as:

$$L_{triplet} = \Sigma_{\forall T} \max(0, \|F(I_R) - F(A_P)\|_2 - \|F(I_R) - F(A_N)\|_2 + m) \qquad \text{EQ. 2}$$

Where $F(I_R)$ is the embedding 308 of the neural network in training for the reference visual $(I_R)$, $F(A_N)$ is the embedding 311 of the neural network in training for the negative audio $(A_N)$, and $F(A_P)$ is the embedding 309 of the neural network in training for the positive audio (A m is a margin that defines the minimum separation between the embeddings for the negative audio and the positive audio. $L_{triplet}$ is optimized during training to maximize the distance between the pairing of the reference visual input 301 and the negative audio 303 and minimize the distance between the reference visual input 301 and the positive audio 302.

After many rounds of training with triplets, including both the negative training set 303 and the positive training set 302, the correlational NN 305 is configured to learn visual and audio embeddings. The correlational NN learns embeddings in such a way so as to produce a distance value between the positive audio embedding 309 and reference image or video embedding at 308 that is less than the distance value between the negative audio embedding 311 and reference visual embedding 308. The distance may be, without limitation, computed as cosine distance, Euclidean distance, or any other type of pairwise distance function. The embedding generated by such a trained correlational NN can be used by a sound recommendation tool to recommend sound effects that can be matched with a visual scene or video segment, as will be discussed below.

Learning Fine-Grained Audio-Visual Correlation Through Localization

Figure 4:
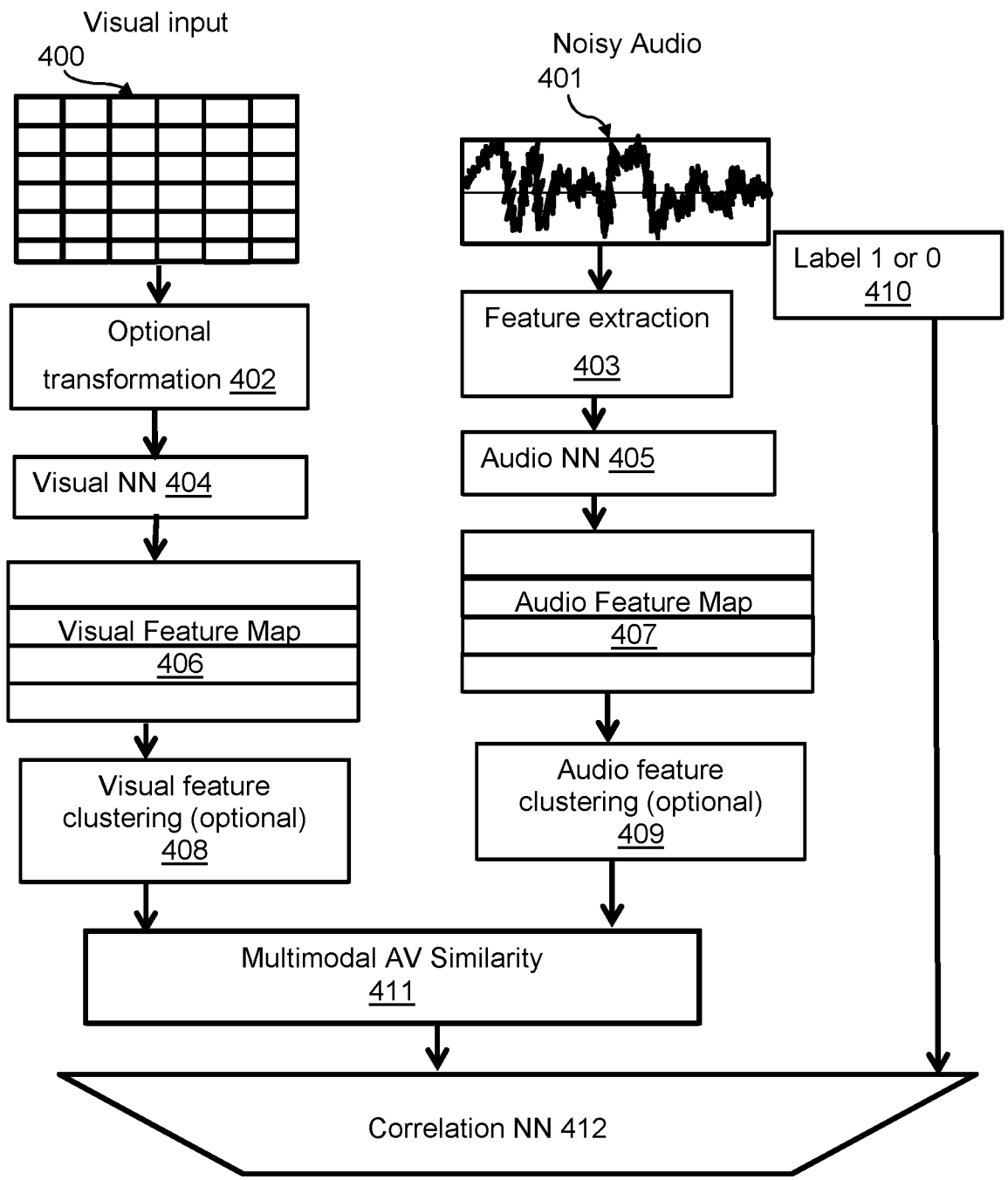
FIG. 4 is a block diagram showing the training of a NN for learning fine-grained audio-visual correlations based on audio containing a mixture of sound sources, for use in the Sound Recommendation Tool according to aspects of the present disclosure.

The machine learning models in FIG. 2A, FIG. 2B, and FIG. 3 learn a coarse-grained Audio-Visual correlation by encoding each audio input as well as visual input into a single coarse-grained embedding (representation). When the visual input is a complex scene with multiple objects and the audio input is a mixture of a sound sources, the recommendation performance can be improved by learning a fine-grained correlation that is able to localize the audio sources by correlating the regions within the visual input that may be related to the different sound sources. FIG. 4 depicts such a method that learns a fine-grained audio-visual correlation by localizing the audio-visual features. This method may be considered as an extension of the method presented in FIG. 2A. The visual input 400 may be a still image, video frame, or video segment. As described above for FIG. 2A, the noisy audio input 401 may either be a positive audio segment related to the visual scene 400 in which case the label 410 may have a value of 1, or it may be a negative audio segment that is unrelated to the visual scene 400 with, for example and without limitation, a label 410 of value 0. Though label values of 1 and 0 are discussed explicitly because the described correlation is a binary correlation any labels that can be interpreted to describe a binary relationship may be used.

The visual input may be optionally preprocessed and transformed by module 402 and the input is used for training the visual NN 404. Similarly, Feature Extraction module 403 extracts 2D audio features, such as filterbank from the audio input 401, which are then used for training the audio NN 405. The visual NN 404 and audio NN 405 are multi-layered NN that includes one or more convolutional layers, pooling layers, and optionally recurrent layers and attention layers. A visual representation in the form of a 2D or higher dimensional feature map 406 is extracted from the visual NN 404. Similarly, an audio representation in the form of a 2D or higher dimensional feature map 407 is extracted from the audio NN 405. These feature maps contain a set of feature vectors that represent higher-level features learned by the NN from different regions of the visual and audio input.

Some of the feature vectors within the audio and feature maps may be similar. Hence, the visual feature vectors may be optionally consolidated by clustering similar feature vectors together to yield K distinct visual clusters 408, using methods, such as by way of example but not by way of limitation, K-means clustering. Similarly, the audio feature vectors in the audio feature map may be optionally consolidated into K distinct audio clusters 409. The audio feature vectors and visual feature vectors that are (optionally) clustered are then compared and localized by the Multi-modal similarity module 411. For each feature vector derived from the visual map, the Multimodal similarity module 411 computes the most correlated feature vector derived from the audio map and the corresponding correlation score, which may be computed by a similarity metric, such as by way of example, but not by way of limitation, cosine similarity. The correlation scores between different visual and audio feature vectors (representing different regions of the input visual scene and audio input) are then input to the correlation NN 412, which aggregates the scores to predict the overall correlation score for the audio-visual input pair. During each training epoch, the prediction value is compared to the label 410 using a loss function such as cross-entropy loss and the error between the predictions and respective labels is backpropagated through the model to improve the prediction. The objective of training may be, but not limited, to minimizing the cross-entropy loss that measures the error between the predictions and labels.

After many iterations of training including both the negative, uncorrelated audio-visual input pairs and the positive, correlated audio-visual input pairs, the model in FIG. 4 learns an audio representation and visual representation, in such a way that the representations of correlated audio and visual regions are more similar than that of uncorrelated regions. This trained fine-grained audio-visual correlation model can then be used in the Sound Recommendations Tool to generate representations for a new silent video or image and a set of sound effect samples and by comparing those audio and visual representations, recommend sound effects that are most correlated to the different visual elements of the silent visual input.

In some embodiments, the video segments have a frame rate of 1 frame per second and as such each frame is used as an input reference image. In some alternative embodiments, the input image is generated by sampling a video segment with a higher frame down to 1 frame per second and using each frame as an input image. For example and without limitation an input video segment may have a frame rate of 30 frames per second. The input video may be sampled every 15 frames to generate a down sampled 1 frame per second video, then each frame of the down sampled video may be used as input into the NNs. The audio database likewise may contain audio segments of 1 second in length, which may be selected from as positive or negative audio signals. Alternatively, the audio signals may be longer than 1 second in length and 1 second of audio may be selected from the longer audio segment. For example and without limitation the first 1 second of the audio segment may be used or a 1 second sample in the middle of the audio maybe chosen or a 1 second sample at the end of the audio segment may be chosen or a 1 second sample from a random time in the audio segment may be chosen.

Multi-Modal Sound Recommendation Tool

Figure 5:
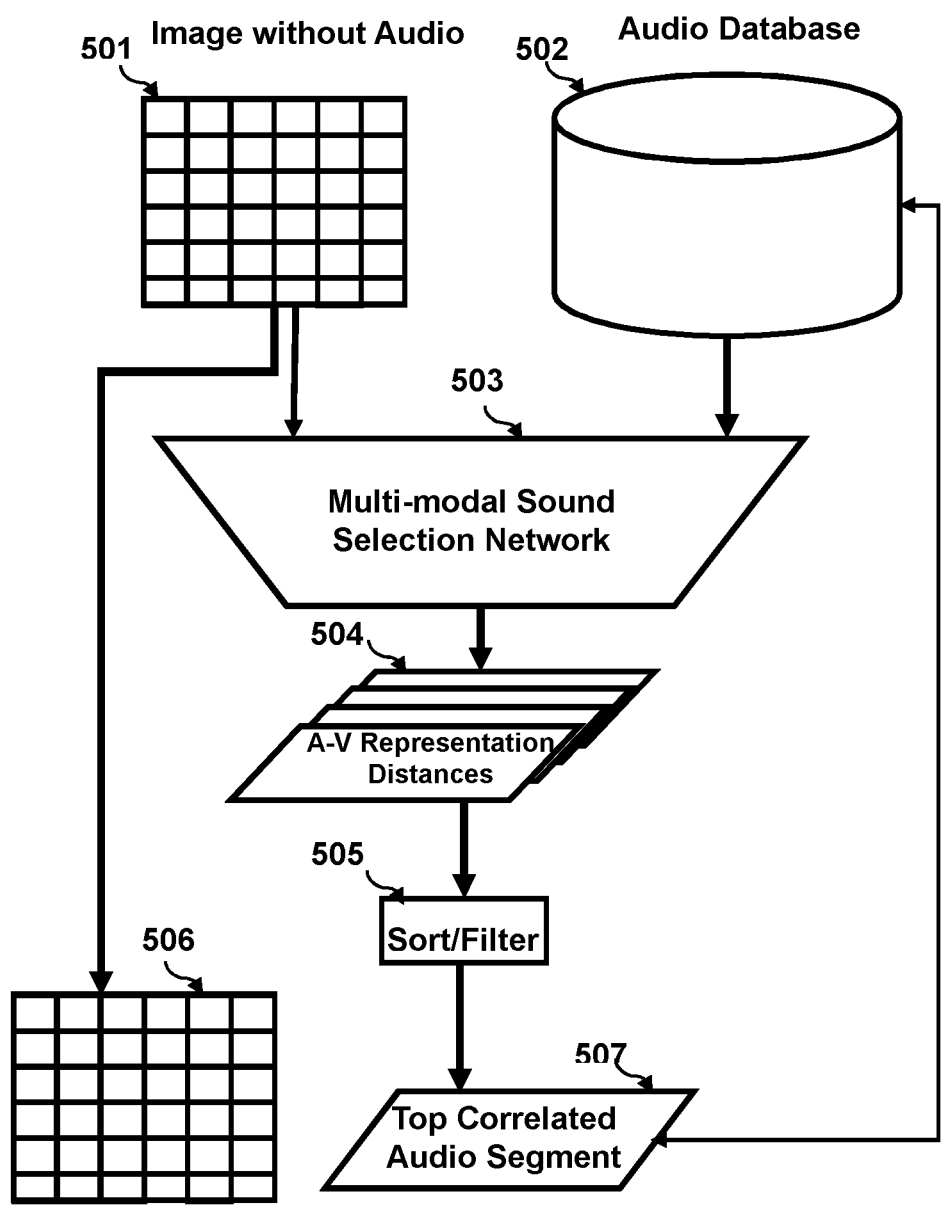
FIG. 5 is a block diagram that depicts a method of using the trained NN in a Sound Effect Recommendation tool for creating a new video with sound, according to aspects of the present disclosure.

FIG. 5 depicts the use of the Multi-modal Sound Recommendation tool according to aspects of the present disclosure. The Multi-modal sound recommendation tool may comprise an audio database 502 and a trained multi-modal correlation neural network 503. The input to the Multi-modal correlation NN 503 may be an input image frame or video without sound 501. The Multi-modal correlation NN 503 is configured to predict the correlation, quantified by a distance value 504, between the representations of the input image frame or video and each audio segment in an audio database or collection of audio samples. After a correlation value 504 has been generated for each audio segment from the audio database, the correlation values are sorted and filtered by 505 to select the audio segments that are best correlated to the input image/video (indicated by the lowest distance values). The sorting and filtering 505 without limitation may filter out every audio segment except the top correlated K audio segments, where K may be a reasonable value such as 1, 5, 10 or 20 audio segments. From this sorting and filtering 505 the most correlated audio segments may be selected either automatically or by a user using the correlation values 507. The best matching audio segment may then be recommended to the sound designer for mixing with the input image frame/video. In some alternative embodiments, more than one audio segment is chosen as a best match using their correlation values 507 and these audio segments are all recommended for the silent visual input 506.

The audio segments in the audio database are subject to a feature extraction and optionally a feature normalization process before they are input to the Multi-modal sound selection NN 503. The extracted audio features may be for example and without limitation, filterbank, spectrogram or other similar 2D audio features. Similarly, the input image/video may be subject to some transformations, such as feature normalization, resizing, cropping, before it is input to the Multi-modal sound selection network 503.

According to some aspects of the present disclosure the Multi-modal sound selection NN 503 may be one of the trained models from FIG. 2A, FIG. 2B, FIG. 3, or FIG. 4, each configured to output audio-visual representations for the visual input 501 and the corresponding audio inputs, which may be audio segments from the audio database 502. These representations are then used to generate the correlated distance values 504 and select the top-K correlated sounds for the visual input. According to other alternative aspects of the present disclosure the Multi-modal sound recommendation tool may merge the top most recommended sounds from one or more trained models in FIG. 2A, FIG. 2B, FIG. 3, or FIG. 4.

According to some aspects of the present disclosure, the audio database 502 may contain a vast number of different audio segments arranged into a taxonomy. Searches of the database using the tool may yield too many correlated sounds, if there are no constraints. Therefore, according to some aspects of the present disclosure the input audio segments from the database 502 may be limited to a category or subcategory in the taxonomy. Alternatively, a visual understanding approach may be applied to limit searches to relevant portions of the database. Neural Networks trained for Object recognition and visual description to identify visual elements and map the visual elements to sound categories/subcategories may be used to limit searches within the audio databases.

System

Figure 6:
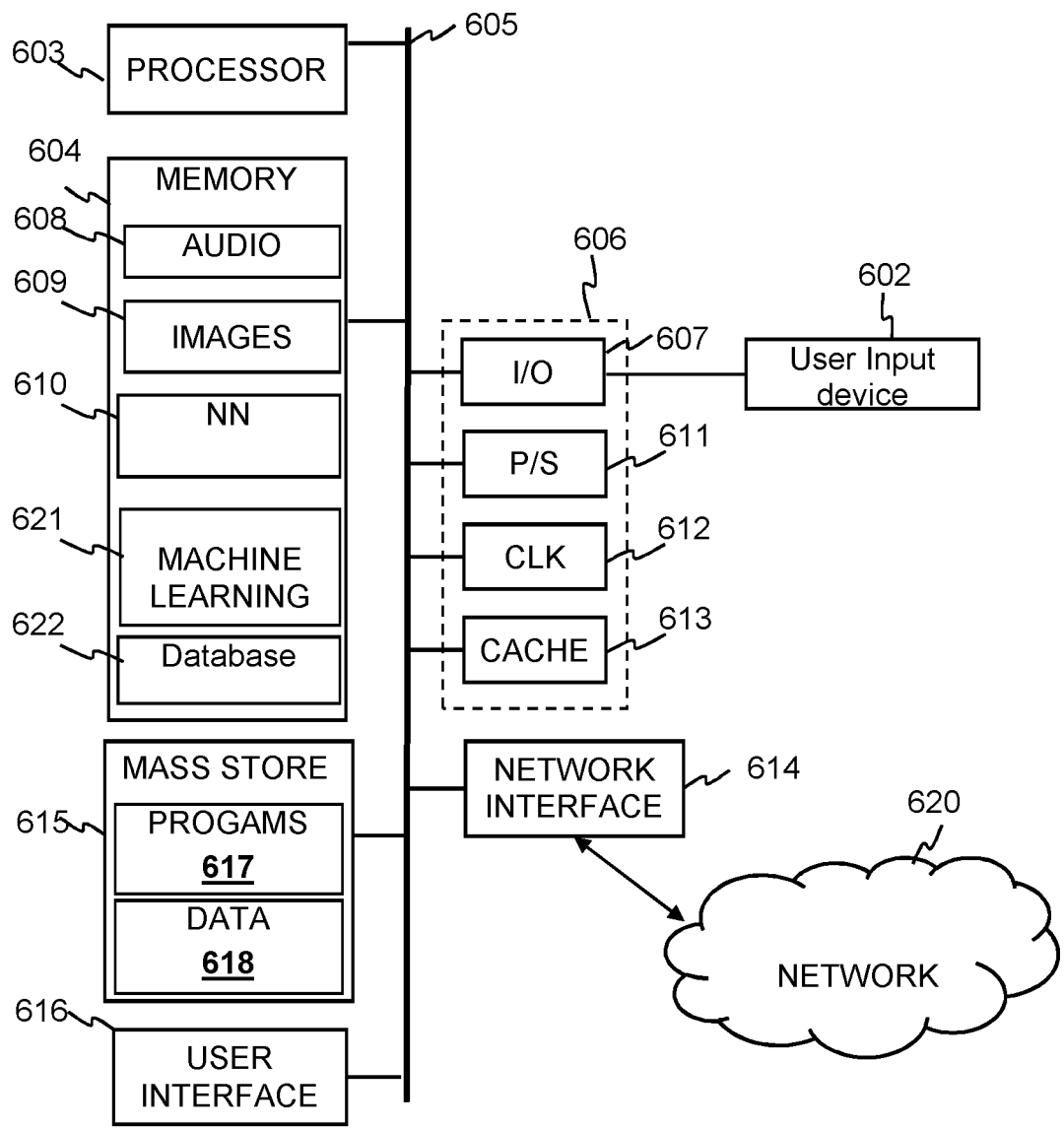
FIG. 6 is a block system diagram depicting a system implementing the training of neural networks and use of the Sound Effect Recommendation Tool according to aspects of the present disclosure.

FIG. 6 depicts a multi-modal sound recommendation system for implementing training and the sound selection methods like that shown in Figures throughout the specification for example FIGS. 1, 2, 3, 4 and 5. The system may include a computing device 600 coupled to a user input device 602. The user input device 602 may be a controller, touch screen, microphone, keyboard, mouse, joystick or other device that allows the user to input information including sound data in to the system. The user input device may be coupled to a haptic feedback device 621. The haptic feedback device 621 may be for example a vibration motor, force feedback system, ultrasonic feedback system, or air pressure feedback system.

The computing device 600 may include one or more processor units 603, which may be configured according to well-known architectures, such as, e.g., single-core, dual-core, quad-core, multi-core, processor-coprocessor, cell processor, and the like. The computing device may also include one or more memory units 604 (e.g., random access memory (RAM), dynamic random access memory (DRAM), read-only memory (ROM), and the like).

The processor unit 603 may execute one or more programs, portions of which may be stored in the memory 604 and the processor 603 may be operatively coupled to the memory, e.g., by accessing the memory via a data bus 605. The programs may include machine learning algorithms 621 configured to adjust the weights and transition values of NNs 610 as discussed above where, the NNs 610 are any of the NNs shown in FIG. 2, 3 or 4. Additionally, the Memory 604 may store audio signals 608 that may be the positive, negative or reference audio used in training the NNs 610 with the machine learning algorithms 621. Additionally the reference, positive, and negative audio signals may be stored in the audio database 622. Image frames or videos 609 used in training the NNs 610 may also be stored in the Memory 604. The image frames or videos 609 may also be used with the audio database 622 in the operation of the sound recommendation tool as shown in FIG. 5 and described hereinabove. The database 622, image frames/video 609, audio signals 608 may be stored as data 618 and machine learning algorithms 621 may be stored as programs 617 in the Mass Store 618 or at a server coupled to the Network 620 accessed through the network interface 614.

Input audio, image, and/or video, may be stored as data 618 in the Mass Store 615. The processor unit 603 is further configured to execute one or more programs 617 stored in the mass store 615 or in memory 604, which cause the processor to carry out the one or more of the methods described above.

The computing device 600 may also include well-known support circuits, such as input/output (I/O) 607, circuits, power supplies (P/S) 611, a clock (CLK) 612, and cache 613, which may communicate with other components of the system, e.g., via the bus 605. The computing device may include a network interface 614. The processor unit 603 and network interface 614 may be configured to implement a local area network (LAN) or personal area network (PAN), via a suitable network protocol, e.g., Bluetooth, for a PAN. The computing device may optionally include a mass storage device 615 such as a disk drive, CD-ROM drive, tape drive, flash memory, or the like, and the mass storage device may store programs and/or data. The computing device may also include a user interface 616 to facilitate interaction between the system and a user. The user interface may include a monitor, Television screen, speakers, headphones or other devices that communicate information to the user.

The computing device 600 may include a network interface 614 to facilitate communication via an electronic communications network 620. The network interface 614 may be configured to implement wired or wireless communication over local area networks and wide area networks such as the Internet. The device 600 may send and receive data and/or requests for files via one or more message packets over the network 620. Message packets sent over the network 620 may temporarily be stored in a buffer in memory 604. The audio database may be available through the network 620 and stored partially in memory 604 for use.

The proposed methods provide ways to learn audio-visual correlation (more generally multimodal correlation) in a self-supervised manner without requiring labels or manual annotations. The proposed machine learning method learns coarse-grained audio-visual representations based on noisy audio input and uses that to determine coarse-grained multimodal (audio-visual) correlation. The proposed machine learning method predicts the clean reference audio sources included in a noisy audio mixture and using the predicted clean audio sources to learn coarse-grained audio-visual representations and determines coarse-grained multimodal (audio-visual) correlation. The machine learning methods can learn audio-visual representations and determine coarse-grained multimodal (audio-visual) correlations from input triplets consisting of reference image or video, a positive audio signal, and a negative audio signal with respect to the reference visual input. The multimodal correlation neural network after being trained can generate a representation (embedding) for a given audio. The multimodal correlation neural network after being trained can generate a representation (embedding) for a given image/video. For a pair of correlated image/video and audio, the visual representation generated in and audio representation generated in are likely to be close (that is, distance between them is small). For a pair of uncorrelated image/video and audio, the visual representation generated and audio representation generated are likely to be dissimilar (that is, distance between them is large). A trained correlation NN or Multimodal clustering NN may be used to automatically select and recommend only those sound samples that are most relevant for a visual scene or video. The selected sound samples may refer to sounds directly produced by one or more objects in the visual scene and/or may be indirectly associated with one or more objects in the visual scene.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for using a sound effects recommendation network comprising:
   a) using a trained Sound Recommendation Network configured to output an audio embedding and visual embedding and using the audio embedding and visual embedding to compute a correlation distance between an image frame or video segment and one or more audio segments retrieved from a database;

b) sorting the correlation distances for the one or more audio segments in the database;

c) determining from among the one or more audio segments from the database, one or more audio segments with the lowest value correlation distance from the sorted audio correlation distances of the one or more audio segments from the database; and d) applying the audio segment with the lowest value audio correlation distance to the input image frame or video segment.

2. The method of claim 1 wherein the Sound Recommendation Network includes audio-video Correlation neural network trained using a machine learning algorithm that includes a pairwise loss function.

3. The method of claim 1 wherein the sound recommendation network includes a multimodal correlation network that is trained using a set of audio-visual paired samples, in a self-supervised manner without any manual annotations or labels wherein:

the paired audio-visual samples used for training include a positive pair consisting of a single audio source or a mixture of audio sources that are related to the visual scene; and a negative pair consisting of a single audio source or a mixture of audio sources that are unrelated to the visual scene;

the network is trained using a machine learning algorithm that learns a coarse-grained relation between the audio and visual input, or a fine-grained relation with or without clustering individual regions of the audio and visual input, using pairwise similarity or triplet similarity.

4. The method of claim 3 wherein the Sound Recommendation Network includes a visual subnetwork and wherein the visual subnetwork generates feature vectors for the input image frame or video segment before a correlation distance is generated.

5. The method of claim 4 wherein the visual subnetwork is configured to provide a feature map for the image frame or video segment.

6. The method of claim 1 wherein the database includes one or more filtered audio segments and the one or more filtered audio segments are used as inputs to the Sound Recommendation Network.

7. The method of claim 1 wherein the input image or video segment is taken from an input video and wherein the input video lacks sound.

8. The method of claim 7 wherein the input video has a down sampled frame rate.

9. The method of 8 wherein the down sampled input video is a 1 frame per second video or a 30 frame per second video and the input image frame or video segment is 1 second of the down sampled input video.

10. The method of claim 1 wherein sorting the correlation distances includes choosing the top five correlation distances denoting a close relation between the audio segment and the input image frame or video segment and wherein determining one or more audio segments includes associating the top five correlation distances with their corresponding audio segments.

11. A Sound Effects Recommendation system comprising:
a Processor;
a Memory coupled to the Processor;
non-transitory instructions embedded in the Memory that when executed cause the Processor to carry out the method comprising:

a) using a trained Sound Recommendation Network configured to output an audio embedding and visual embedding and using the audio embedding and the visual embedding to compute a correlation distance between an image frame or video segment and one or more audio segments retrieved from a database;

b) sorting the correlation distances for the one or more audio segments in the database;

c) determining from among the one or more audio segments from the database, one or more audio segments with the lowest value correlation distance from the sorted audio correlation distances of the one or more audio segments from the database; and d) applying the audio segment with the lowest value audio correlation distance to the input image frame or video segment.

12. The system of claim 11 wherein the Sound Recommendation Network includes multimodal Correlation neural network trained using a machine learning algorithm that includes a pairwise loss function or triplet contrastive loss function.

13. The system of claim 11 wherein the sound recommendation network includes a multimodal correlation network that is trained using a set of audio-visual paired samples, in a self-supervised manner without any manual annotations or labels wherein:

the paired audio-visual samples used for training include a positive pair consisting of a single audio source or a mixture of audio sources that are related to the visual scene; and a negative pair consisting of a single audio source or a mixture of audio sources that are unrelated to the visual scene;

the network may be trained using a machine learning algorithm that learns a coarse-grained relation between the audio and visual input, or a fine-grained relation with or without clustering individual regions of the audio and visual input, using pairwise similarity or triplet similarity.

14. The system of claim 13 wherein the Sound Recommendation Network includes a visual subnetwork and wherein the visual subnetwork generates visual feature vectors for the input image frame or video segment before a correlation distance is generated.

15. The system of claim 14 wherein the visual subnetwork configured to provide a feature map for the image frame or video segment.

16. The system of claim 11 wherein the database includes one or more audio segments that are used as inputs to the Sound Recommendation Network.

17. The system of claim 11 wherein the input image or video segment is taken from an input video wherein the input video lacks sound.

18. The system of claim 17 wherein the input video has a down sampled frame rate.

19. The system of claim 18 wherein the down sampled video is a 1 frame per second video or a 30 frame per second video and the input image frame or video segment is 1 second of the down sampled input video.

20. The system of claim 11 wherein sorting the correlation distances includes choosing the top five correlation distances denoting a close relation between one of the one or more audio segments and the input image or video segment and wherein determining one or more audio segments includes associating the top five correlation distances with their corresponding audio segments.

21. Non-transitory instructions embedded in a computer readable medium that when executed by a computer cause the computer to carry out the method comprising:
   a) using a trained Sound Recommendation Network configured to provide an audio embedding and visual embedding and using the audio embedding and the visual embedding to compute a correlation distance between an image frame or video segment and one or more audio segments retrieved from a database;
   b) sorting the correlation distances for the one or more audio segments in the database;
   c) determining from among one or more audio segments from the database, one or more audio segments with the lowest value correlation distance from the sorted audio correlation distances of the one or more audio segments from the database; and
   d) applying the audio segment with the lowest value audio correlation distance to the input image frame or video segment.

22. The non-transitory instructions of claim 21 wherein the sound recommendation network includes a multimodal correlation network that is trained using a set of audio-visual paired samples, in a self-supervised manner without any manual annotations or labels wherein:

the paired audio-visual samples used for training include a positive pair consisting of a single audio source or a mixture of audio sources that are related to the visual scene; and a negative pair consisting of a single audio source or a mixture of audio sources that are unrelated to the visual scene;

the network may be trained using a machine learning algorithm that learns a coarse-grained relation between the audio and visual input, or a fine-grained relation with or without clustering individual regions of the audio and visual input, using pairwise similarity or triplet similarity.

* * * * *